B. GIULIO.
POOL TABLE.
APPLICATION FILED APR. 11, 1910.
964,236.
Patented July 12, 1910.
2 SHEETS—SHEET 1.
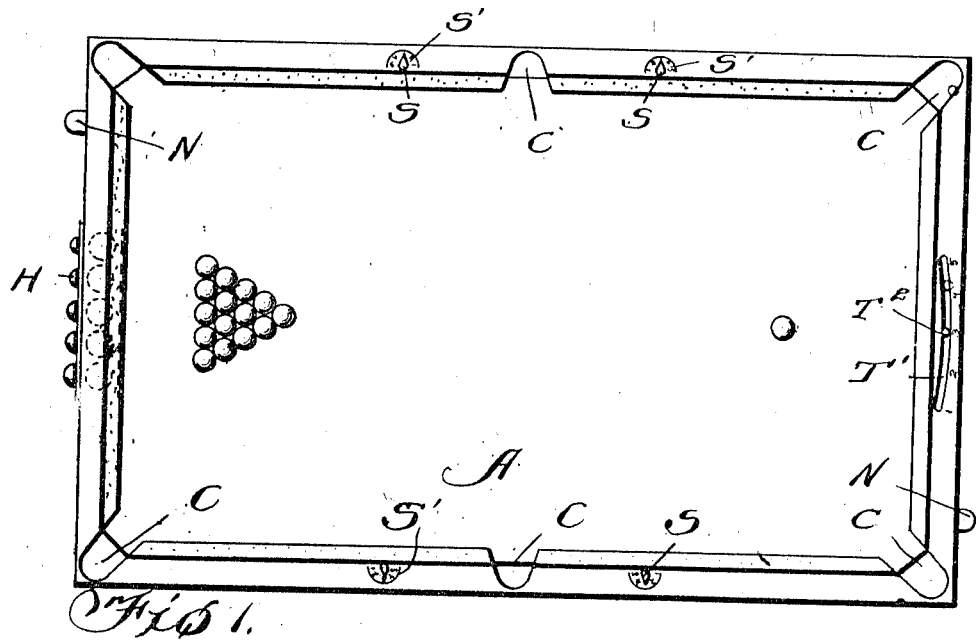
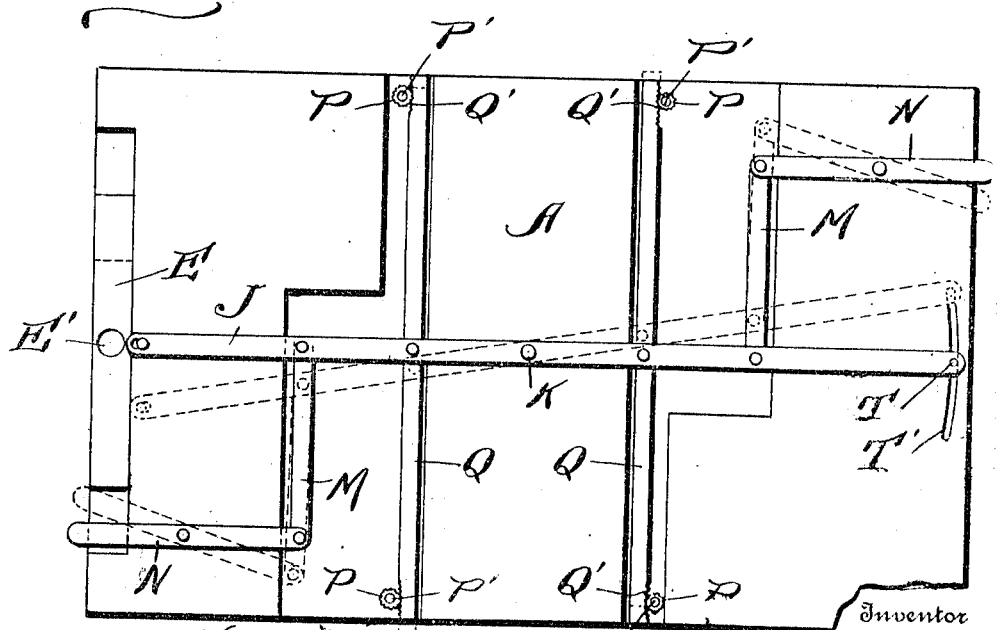

B. GIULIO.
POOL TABLE.
APPLICATION FILED APR. 11, 1910.
964,236.
Patented July 12, 1910.
2 SHEETS—SHEET 2.
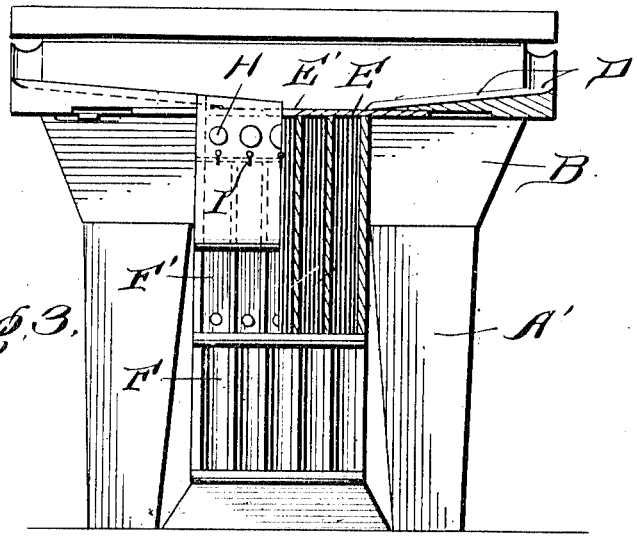

UNITED STATES PATENT OFFICE.

BIONDI GIULIO, OF SILVERTON, COLORADO.

POOL-TABLE.

964,236.

Specification of Letters Patent. Patented July 12, 1910.

Application filed April 11, 1910. Serial No. 554,721.

*To all whom it may concern:*

Be it known that I, BIONDI GIULIO, a subject of the King of Italy, residing at Silverton, in the county of San Juan and State of Colorado, have invented certain new and useful Improvements in Pool-Tables; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in pool tables, the object being to provide a means whereby the balls as they enter a pocket will roll by gravity into a partition cabinet, one compartment being provided for each player and causing a bell to ring as the ball enters the compartment.

The invention consists further, in connection with the pool table, of means for automatically adjusting the apparatus whereby the balls of the different players may be directed to any one particular compartment and in the provision of means for indicating the number of the pocket corresponding to the player.

The invention comprises various details of construction, combinations and arrangements of parts which will be hereinafter fully described and then specifically defined in the appended claims.

I illustrate my invention in the accompanying drawings, in which:—

Figure 1 is a top plan view of the table. Fig. 2 is a bottom plan view of a portion of the top removed. Fig. 3 is a detail sectional view vertically through the compartments into which the ball is adapted to roll. Fig. 4 is a sectional view at right angles through the ball containing compartment. Fig. 5 is an edge view of the table showing the inclined way down which the balls roll, and Fig. 6 is an end view.

Reference now being had to the details of the drawings by letter, A designates a bed portion for the table B and is supported upon the legs A'. The table top proper is provided with the usual pockets C at the corners and at points opposite on the longitudinal sides of the table, and inclined ways D are formed in the opposite sides of the table and extend about one end of the table and adapted to deliver the ball upon a laterally projecting slide E which is adapted to determine the particular compartment into which the ball is adapted to be deposited. At one end of the table is positioned a cabinet F having a plurality of compartments for the reception of balls of the different players, it being my purpose to provide one compartment for each player. Each of said compartments is provided with a door F' whereby access may be had to the compartment and mounted upon the cabinet or other suitable location adjacent thereto is a series of bells H, one for each compartment and each having preferably a distinct tone. Pivotally mounted upon the cabinet are the bell hammers I, one for each of said bells and one end of each hammer is adapted to be positioned in the upper portion of its respective compartment and forming means whereby, when the ball drops into the compartment, it will contact against the projecting end of the hammer and cause the bell indicating that compartment to ring.

The slide E is provided with an opening E' adapted to be brought into registration with the opening in any one of the compartments and is pivotally connected to a bar J which is mounted upon a pivotal pin K upon the under side of the table. In order that the slide E may be moved from either end of the table, I provide two operating levers, designated respectively by letter N, each of which is pivotally mounted upon the under side of the table and has pivotal link connections M with the tilting bar J. Pivotally connected to the bar J are the rack bars Q, each of which has teeth Q' upon one of its edges which are adapted to mesh with the pinions P which have stub shafts P' extending through the rim of the table and having indicating pointers S fixed to their upper ends, said indicating pointers being adapted to move over the dial S' upon the marginal edge of the table, said dial having numbers corresponding to the numbers of the compartments in said cabinet. The strip J has a pin T fixed thereto which extends through an elongated slot T' formed in the table at one end, said pin projecting through the slot and having an indicating pointer $T^2$ adapted to indicate opposite the numerals adjacent to the slot in the end, thereby forming five different indicating means, two each upon opposite longitudinal sides and one at the end of the table.

The operation of my invention will be readily understood and is as follows:—Each player selects a number corresponding to a certain compartment. When the turn of a party selecting a certain number arrives for his play, one or the other of the operating levers is tilted so as to cause the opening in the slide E to register with the opening leading into his particular compartment in the cabinet. The movement of the slide incident to bringing this opening into such position will cause an indicating pointer to move over the dial to indicate a number corresponding with the number of the compartment to receive the ball of the particular player. As the balls enter the pockets, they will roll by gravity to the particular compartment indicated upon the dial and, as they enter the compartment, the ball falling against the hammer will cause the bell of a distinct tone to ring, designating that the ball has entered the compartment. When the time arrives for the next player to play, the lever may be regulated to adjust the slide so that any ball entering the pocket will roll to such player's compartment and indicating on the dial the number of the compartment and ringing a bell of distinct tone. After the game has been finished or it is desired to remove the balls from their respective compartments in the cabinet, the tops of said compartments may be opened and the balls readily removed.

What I claim to be new is:—

1. A pool table having pockets, a cabinet at one end of the table divided into compartments, inclined grooves connecting the various pockets with the cabinet, an apertured slide at the exit ends of said grooves and adapted to direct a ball to any particular compartment, and means for moving said slide.

2. A pool table having pockets, a cabinet at one end of the table divided into compartments, inclined grooves connecting the various pockets with the cabinet, an apertured slide at the exit ends of said grooves and adapted to direct a ball to any particular compartment, indicating mechanism upon the table, and means for moving the same simultaneously with the slide to adjust the latter to allow balls to enter a certain compartment and indicate the compartment.

3. A pool table having pockets, a cabinet at one end of the table divided into compartments, inclined grooves connecting the various pockets with the cabinet, an apertured slide at the exit ends of said grooves and adapted to direct a ball to any particular compartment, indicating mechanism upon the table, means for moving the same simultaneously with the slide to adjust the latter to allow the balls to enter a certain compartment and indicate the compartment, a bell for each compartment, and hammers having their ends projecting one into each compartment and in the paths of said balls as they enter the compartments.

4. A pool table having pockets, inclined grooves leading from the latter, a cabinet at one end of the table divided into compartments, an apertured slide at the exit ends of said grooves and adapted to guide balls into said compartments, a bell for each compartment, a hammer positioned in the path of each ball entering a compartment, a dial upon the marginal edge of the table, an indicating pointer movable over the same, a pivotal bar connected to said slide, pinion wheels having shafts extending through the marginal edge of the table and connected to said pointers, rack bars engaging said pinions and fastened to said slide-actuating bar, and pivotal levers for tilting said bar.

In testimony whereof I hereunto affix my signature in the presence of two witnesses.

BIONDI GIULIO.

Witnesses:
GEO. PEZZETTO,
AMBRAZIO SIMONIELLI.